United States Patent
Carter et al.

[11] Patent Number: 5,916,701
[45] Date of Patent: Jun. 29, 1999

[54] SECURED ANODE SEAL FOR A FUEL CELL

[75] Inventors: Dennis L. Carter, Hudson; Dane W. Gregg, Hartville; James T. Frater, Akron; Alan F. Lindsay, Massillon, all of Ohio

[73] Assignee: Lockheed Marin Tactical Defense Systems, Inc., Akron, Ohio

[21] Appl. No.: 08/960,890

[22] Filed: Oct. 30, 1997

[51] Int. Cl.$^6$ ........................................ H01M 8/02
[52] U.S. Cl. .................................. 429/34; 429/37
[58] Field of Search ................. 429/22, 26, 34, 429/35, 37, 101, 120

[56] References Cited

U.S. PATENT DOCUMENTS 5,789,093   8/1998   Malhi ........................................ 429/34

*Primary Examiner*—Maria Nuzzolillo
*Assistant Examiner*—Monique Wills
*Attorney, Agent, or Firm*—Renner, Kenner, Greive, Bobak, Taylor & Weber

[57] ABSTRACT

The present invention provides a secured anode seal for a fuel cell which includes at least one housing having a base securable to a top frame wherein the frame has a notch and a recess edge facing the base and a cathode secured between the base and the top frame. A boot is secured between the base and the top frame and received in the notch and recessed edge, wherein an electrolyte chamber is formed between the boot and the cathode and a coolant chamber is formed between the boot and the top frame wherein the boot has a plurality of holes therethrough. The invention also includes an anode which has a plurality of integral posts extending through the plurality of holes of the boot wherein each of the plurality of posts has a head for securing the boot to the anode for precluding migration of material between the electrolyte chamber and the coolant chamber. Also provided in the present invention is a backing plate having a plurality of holes therethrough and a ridge extending downwardly therefrom wherein the backing plate holes fit over the plurality of posts and are underneath the head and wherein the ridge contacts the boot to provide a compressive seal therebetween. A collector strap may also be secured between the backing plate and the heads formed by the plurality of posts. In a moving anode configuration, a spring is disposed between the backing plate and the housing to maintain a predetermined distance between the anode and cathode so as to generate a constant supply of electrical power.

19 Claims, 2 Drawing Sheets

SECURED ANODE SEAL FOR A FUEL CELL

TECHNICAL FIELD

The present invention herein resides generally in the art of fuel cells. More particularly, the present invention relates to the secure attachment of a boot to an anode employed in either a fixed or moving anode assembly within the fuel cell. Specifically, the present invention relates to integral posts extending from the anode which are deformable to secure the boot to the anode.

BACKGROUND ART

It is very desirable for fuel cells to generate a constant flow of electrical power. Uneven or interrupted flow of electrical power may result in failure of the device being powered by the fuel cell. To obtain a more constant generation of electrical power some fuel cells employ a moving anode configuration. The moving anode maintains the anode at a predetermined distance from a cathode by using standoffs extending between the anode and the cathode, and by applying a biasing force to the anode. Use of the biasing force maintains the anode at a predetermined distance from the cathode even as electrolyte passes therebetween. Meanwhile, an oxidizing agent is exposed to the cathode which in turn consumes the anode material. Without the biasing force applied, consumption of the anode material would cause an increase in the distance between the anode and cathode and accordingly cause fluctuations in the generation of electrical power.

In order to ensure that the moving anode is maintained at a constant distance from the cathode, the anode is secured to a boot usually made of a rubber-like material. The boot seals around one side of the anode and is secured to the fuel cell housing. The boot provides a seal between the electrolyte flowing between the anode and cathode and the coolant flowing on the opposite side of the anode. If the seal between the electrolyte and the coolant is breached, the fuel cell becomes ineffective and eventually fails.

In the past, attachment of the boot to the anode included bonding the boot to the anode with various types of adhesive, and/or plating the anode with nickel or other alloys and then bonding the anode to the boot. In addition to bonding the boot to the anode it is also required that a lead be connected to the anode to complete the electrical connection for the fuel cell. Connection of the lead must be accomplished without degrading the seal between the boot and the anode. This connection of the lead has been accomplished by using conductive epoxy, nickel-plating the anode and then soldering the lead thereto or by using deep solder-filled holes in the top of the anode in which the lead is encased. Unfortunately, these attempts at bonding the boot to the anode with a lead connected thereto only last about six hours which is unsuitable for long-life use. It has been found that the electrolyte, which is naturally attracted to the anode material, attacks the plating and/or bonding material disposed on the anode and destroys the bond between the boot and the anode, which in turn causes failure of the fuel cell. It will also be appreciated that as the anode material is consumed, the rigidity of the anode is lost which causes deviations in the spacing between the anode and cathode.

In light of the foregoing, it is evident that there is a need in the art for a sealed anode assembly within a fuel cell that is robust and long-lasting. Moreover there is a need in the art for secured anode within a fuel cell for generating a constant amount of electrical power.

DISCLOSURE OF INVENTION

In light of the foregoing, it is a first aspect of the present invention to provide a secured anode seal for a fuel cell.

Another aspect of the present invention is to provide an anode for use in the fuel cell wherein posts extend outwardly from one side of the anode.

Yet another aspect of the present invention, as set forth above, is to provide a boot with a plurality of holes that fit over the posts extending from the anode, wherein deformation of the posts form rivet heads to secure the boot to the anode.

It is still another aspect of the present invention, as set forth above, to provide a backing plate with a plurality of holes therethrough and a ridge extending downwardly therefrom, wherein the backing plate is placed over the boot and captured between the rivet heads and the anode, wherein the ridge presses the boot against the anode to provide an effective seal therebetween, and wherein the backing plate provides stiffness to the anode as the anode is consumed during oxidation.

A further aspect of the present invention, as set forth above, is to provide a collector strap with a plurality of holes therethrough that is placed over a portion of the backing plate and secured by the rivet heads to allow for an electrical connection between a load and the anode.

Yet a further aspect of the present invention, as set forth above, is to provide the boot with an extending web which is captured within the housing and which maintains separation of the electrolyte from the coolant applied to the non-consumed side of the anode.

Still a further aspect of the present invention, as set forth above, is to provide a spring between the backing plate and housing holding the anode which provides a biasing force to maintain the anode in a desired position.

An additional aspect of the present invention, as set forth above, is to provide a plurality of spacers disposed on the cathode to maintain a predetermined distance between the anode and cathode.

The foregoing and other aspects of the present invention, which shall become apparent as the detailed description proceeds, are achieved by a fuel cell having a secured anode seal comprising a housing for carrying a cathode; a boot secured to said housing and having a plurality of holes therethrough; and an anode having a plurality of integral posts extending therefrom and into the plurality of holes, the plurality of integral posts deformed into rivet heads to secure the boot to the anode.

Other aspects of the present invention are obtained by an anode assembly received in a fuel cell, comprising an anode with a plurality of posts; a boot; and a collector strap, wherein the boot and the collector strap are connected to the anode by deformation of the plurality of posts into rivet heads.

Still other aspects of the present invention are obtained by a fuel cell comprising at least one housing having a base securable to a top frame, one of the top frame and the base having a notch and a recessed edge facing the other of the top frame and the base; a cathode secured to at least one housing; a boot secured between the base and the top frame and received in the notch and the recessed edge, wherein an electrolyte chamber is formed between the boot and the cathode and a coolant chamber is formed between the boot and one of the top frame and the base, the boot having a plurality of holes therethrough; and an anode having a plurality of posts extending through the plurality of holes, wherein each of the plurality of posts has a head for securing the boot to the anode for precluding migration of material between the electrolyte chamber and the coolant chamber.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
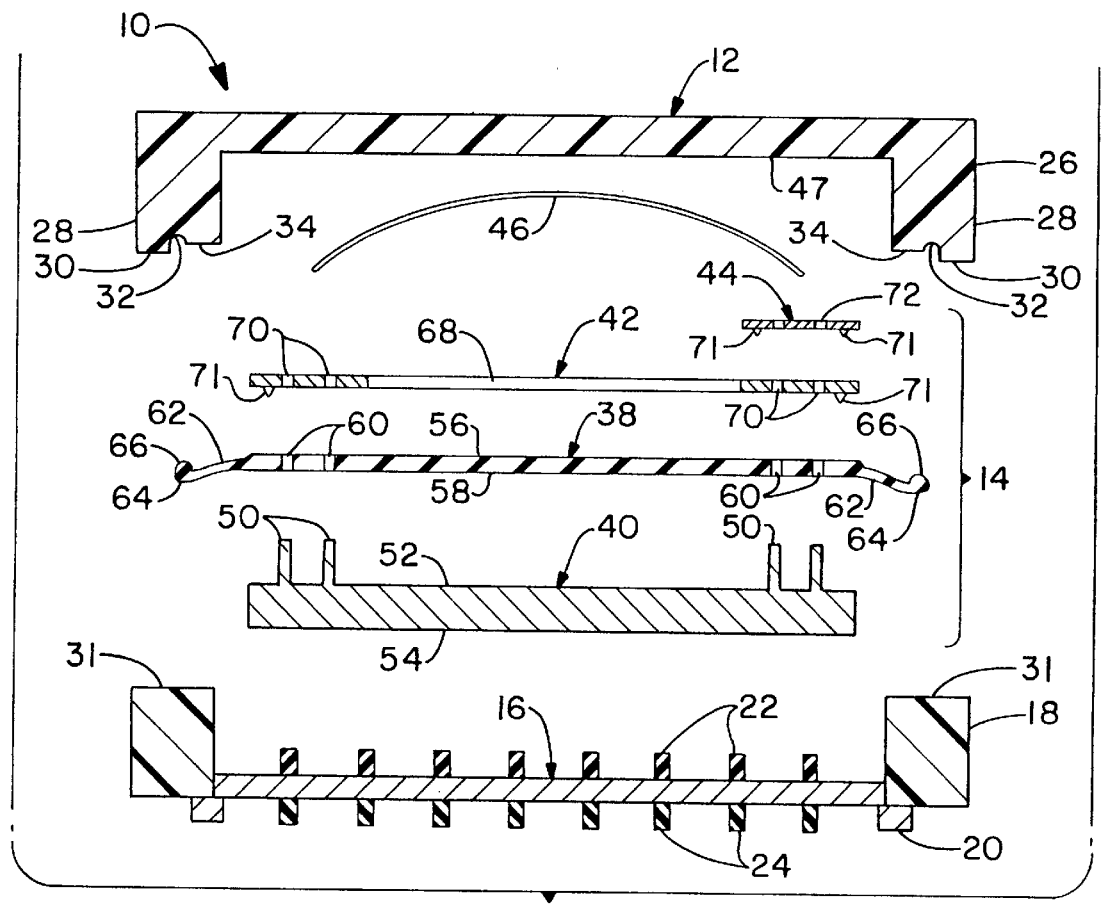
FIG. 1 is an exploded cross-sectional schematic view of a fuel cell including a sealed anode assembly according to the present invention.
Figure 2:
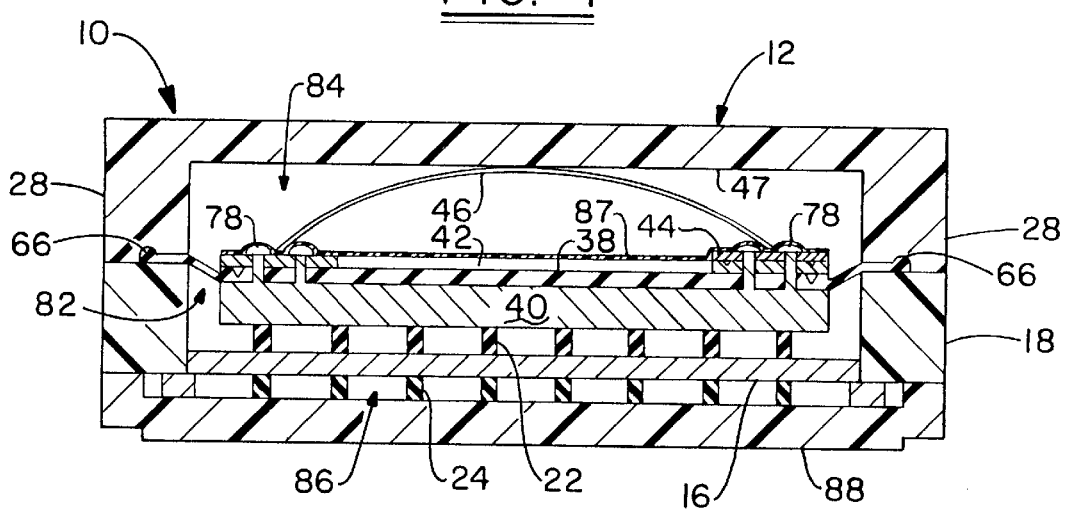
FIG. 2 is an assembled cross-sectional schematic view of the present invention.

Referring now to the drawings, and more particularly to FIGS. 1–2, it can be seen that a fuel cell with a secured anode seal is designated generally by the numeral 10. As shown, the fuel cell 10 includes a housing 12 for carrying an anode assembly 14. It will be appreciated that only one fuel cell 10 is shown; however, the fuel cell 10 may be stacked with additional fuel cells to provide the power required for a particular application. In the present embodiment, the fuel cell 10 is of a generally rectangular shape with FIGS. 1 and 2 providing a cross-sectional view of the width of the fuel cell. FIGS. 1 and 2 also present a moving anode configuration, but it will be appreciated that the aspects of the present invention are equally applicable to a fixed anode construction.

A cathode 16 is carried by the housing 12 and spaced apart from the anode assembly 14 in a manner well known in the art. The housing 12 has ports (not shown) for allowing passage through the fuel cell 10 of electrolyte, such as potassium hydroxide; coolant, such as water; and an oxidizing agent, such as oxygen or air. As is well known in the art, these materials contribute to a chemical reaction within the fuel cell that generates electrical power.

The housing 12 includes a base 18 for carrying the cathode 16. A contact 20 is connected to the cathode 16 and carried by the base 18 to complete the electrical connection for the fuel cell 10. A plurality of cathode standoffs 22 extend from the cathode 16 toward the anode assembly 14. In the preferred embodiment the cathode standoffs 22 are made of a rubber-like material such as EPDM. The cathode standoffs 22 may be interconnected by a mesh or the like to minimize movement of the standoffs in the event one comes loose from the cathode 16 during operation of the fuel cell 10. Extending in an opposite direction from the cathode 16 are a plurality of frame standoffs 24 which are of the same material as the cathode standoffs 22 and which may also be interconnected to one another. In the preferred embodiment, the cathode standoffs 22 and the frame standoffs 24 are about ⅛" in diameter.

A top frame 26 mates with the base 18 and may be secured thereto by fasteners or other similar securing devices known in the art. It will also be appreciated that frame standoffs 24 maintain a predetermined distance between the cathode 16 and an adjacent top frame 26. Each top frame 26 includes a downwardly extending leg 28 which has a mating surface 30 that bears against a top 31 of the base 18 when the housing 12 is completely assembled. The mating surface 30 provides a notch 32 that is contiguous with a recessed edge 34 that is provided along an inner periphery of the mating surface 30. When the base 18 and top frame 26 are secured to one another, the anode assembly 14 is sealingly retained and secured within the notch 32 and recessed edge 34. It will be appreciated that the notch 32 and the recessed edge 34 could be disposed on the base 18 instead to the top frame 28.

Figure 3:
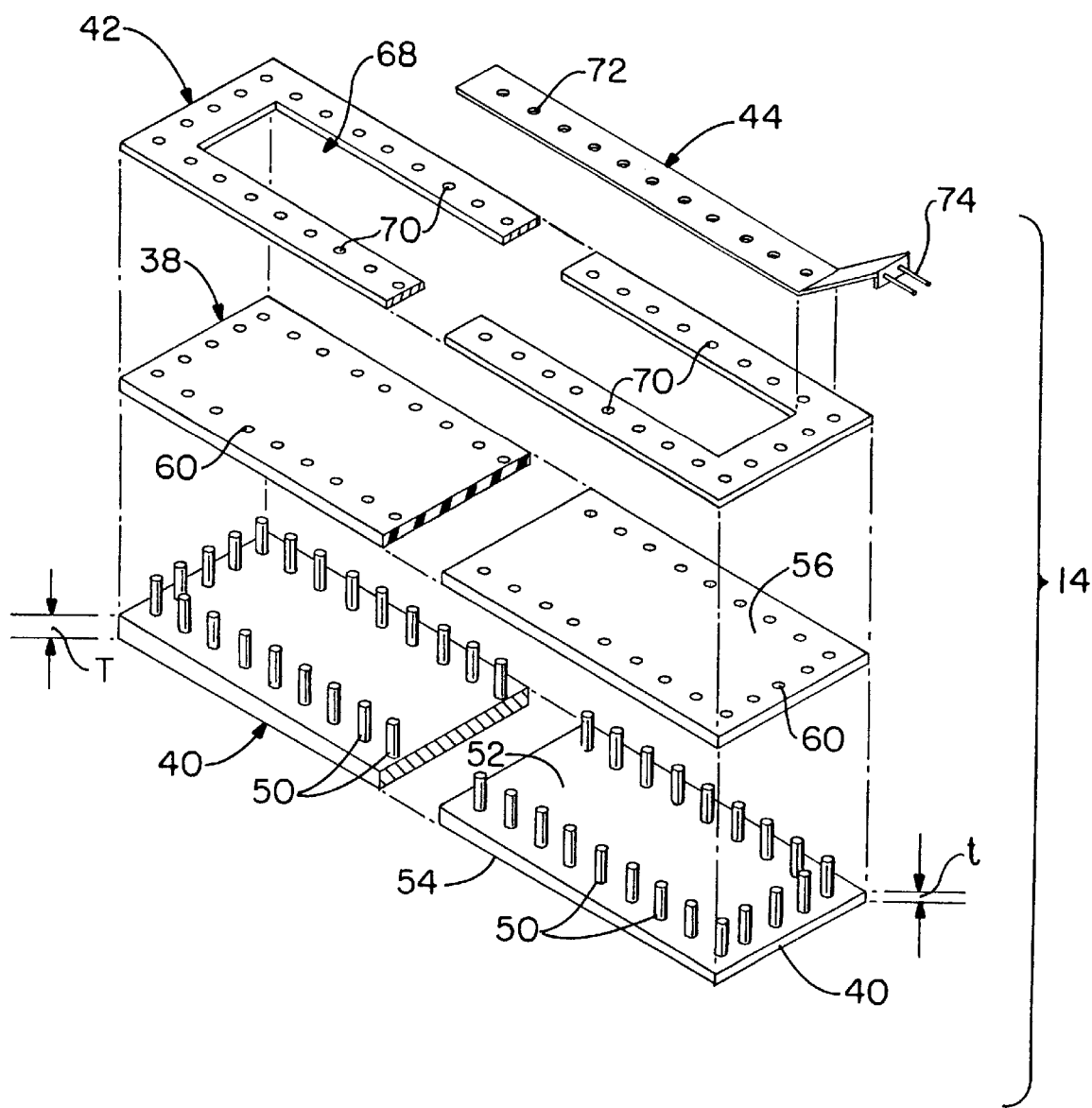
FIG. 3 is an exploded perspective view of the anode assembly according to the present invention.

The anode assembly 14, as best seen in FIG. 3, includes a boot 38 which is captured between an anode 40 and a backing plate 42. A current collector strap 44 is secured to about half the length of the backing plate 42. In the preferred embodiment, the boot 38 is made of a resilient rubber-like material such as EPDM or any other material that is resistant to the chemical reaction and heat generated therefrom within the fuel cell 10. The anode 40, which in the preferred embodiment is made of aluminum, is generally rectangular in shape and may be provided with a slight taper with respect to its thickness dimension in order to increase the useful life thereof. In other words, the anode 40 has a thickness T that tapers downwardly to a thickness t. It has been found that by increasing the thickness of the anode 40 at one end by about 0.050", the overall life of the anode may be extended. The taper compensates for the slight variation of pressure applied to the anode 40 within the fuel cell 10. The backing plate 42 provides rigidity to the anode assembly 14 especially as the material of the anode 40 is consumed during operation of the fuel cell 10.

As best seen in FIGS. 1 and 2, a spring 46 is interposed between an underside 47 of the top frame 26 and the anode assembly 14. In the preferred embodiment, approximately four springs 46 are placed within the fuel cell 10 wherein the vertex of the spring 46 contacts the underside 47 and the ends of the spring 46 contact the backing plate 42 as shown. The springs 46 function to bias the anode 40 toward the cathode 16 during operation of the fuel cell 10. As the anode material is consumed by the chemical reaction, it will be appreciated that the spring 46 biases the anode 40 against the cathode standoffs 22. This biasing of the anode 40 assists in generation of constant electrical power as required by the end-use application. Although the spring 46 is shown as a leaf spring, a helical or other type of spring may be employed.

The anode 40 has a plurality of posts 50 extending away from the cathode 16 toward the top frame 26. In the preferred embodiment, the posts 50 are integral with the anode 40 and may be machined, cast or forged thereon. The anode 40 provides a back surface 52 from which the posts 50 extend and an exposed surface 54 which faces the cathode 16. Although only one row of posts 50 is shown around the periphery of the anode 40, it will be appreciated that multiple rows could be used.

The boot 38 includes a cover 56 which provides an anode sealing surface 58 that faces the back surface 52 of the anode 40. A plurality of holes 60 extend through the anode sealing surface 58 and are sized and positioned to sealingly fit over the plurality of integral posts 50. In other words, each hole 60 is sized to fit over a corresponding post 50 wherein the post 50 slightly deforms the surrounding area of the anode sealing surface 58. A web 62 extends from the outer periphery of the anode sealing surface 58 and a flap 64 angularly extends from the web 62. At the end of the flap 64 is a nub 66 which fits in the notch 32 when the base 18 is secured to the top frame 26. Accordingly, the flap 64 is secured between the top 31 of the base 18 and the recessed edge 34 and sealingly compressed when the top frame 26 is secured upon the base 18.

The backing plate 42, which in the preferred embodiment is made of stainless steel, is rectangularly shaped with an opening 68 therethrough. The backing plate 42 covers the outer periphery of the boot 38 and the anode 40. The backing plate 42 provides a plurality of holes 70 which are sized to fit over the corresponding posts 50 extending from the anode 40. Extending from the periphery of the backing plate 42 toward the boot 38 is at least one ridge 71.

The collector strap 44 includes a plurality of holes 72 that also fit over selected posts 50. At least one lead 74 extends from the collector strap 44 for connection to a load (not shown) which is powered by the fuel cell 10. The collector strap 44 provides uniform current distribution when connected to the anode 40 and as best seen in FIG. 3, covers about half the length of one edge of the backing plate 42. As seen in the drawings the boot 38, the backing plate 42 and the collector strap 44 are sequentially placed over the anode 40 and its plurality of integral posts 50. These components are then held in place with a pre-load force and the posts 50 are deformed to form rivet heads 78 which compress the boot 38 to make an airtight seal between the boot and the anode 40. Compression of the boot 38 is further enhanced by the ridges 71 extending from the backing plate 42 toward the anode 40. Testing has determined that the average pressure under the backing plate 42 is between about 150–180 psi and that the average pressure under the ridges 71 is about 1700–1800 psi.

Once the housing 12 is assembled with the anode assembly 14 and cathode 16 captured therein, it will be appreciated that an electrolyte chamber 82 is formed between the anode assembly 14 and the cathode 16. Likewise, a coolant chamber 84 is formed between the top frame 26 and the anode assembly 14 and an oxidizing chamber 86 is formed between the cathode 16 and the adjacent top frame 26 from an adjacent fuel cell 10. To further ensure that there is no leakage between the electrolyte material and coolant, a layer of epoxy paint 87 or other insulating material may be disposed over the rivet heads 78, the backing plate 42, the collector strap 44 and the boot 38. Moreover, it will be appreciated that the rivet heads 78 may also function as cooling fins to further dissipate heat generated by the chemical reaction during operation of the fuel cell 10. Alternatively, an enclosure frame 88 may be positioned adjacent the cathode 16 to form the oxidizing chamber 86.

From the foregoing structure of the anode assembly 14 and its placement within the housing 12, it is readily apparent that a unique secured anode seal for a fuel cell is provided. Upon assembly of the fuel cell 10, electrolyte material is passed through the electrolyte chamber 82 while an oxidizing gas is passed through the oxidizing chamber 86. Simultaneously, a coolant material, such as water or the like, is passed through the coolant chamber 84. As is well known in the art, a chemical reaction takes place between the cathode, the electrolyte material and the anode 40 to generate electrical power conducted through the current collector strap 44. During the chemical reaction, the anode material 40 is consumed thus increasing the distance between the anode 40 and the cathode 16. To maintain a constant generation of electrical power, the spring 46 biases the anode assembly 14 toward the cathode 16 to maintain the proper spacing and the desired consistent generation of electrical power. During this chemical reaction, the boot 38 is flexed continuously closer toward the cathode 16. Since the electrolyte material is naturally attracted to the anode 40, it attempts to migrate toward the back surface 52 of the anode 40. If the electrolyte material attacks the back surface 52, the connection between the anode 40 and the current collector strap 44 would be diminished and likely cause failure of the fuel cell 10. As such, the secured attachment of the boot 38 to the anode 40 by the rivet heads 78, which sandwiches and compresses the boot 38 against the anode 40, prevents disconnection of the boot 38 from the anode 40 and an intermixing of the coolant and the electrolyte materials.

Based upon the structure and the assembly of the fuel cell 10, it will be appreciated that the present invention is advantageous for several reasons. First, the secure attachment of the boot 38 to the anode 40 precludes intermixing of the electrolyte material with the coolant material which may otherwise cause failure of the fuel cell 10. Still another advantage of the present invention is that the backing plate 42 assists in the secure of attachment of the boot 38 to the anode 40 by virtue of the ridges 71 compressing the boot 38. Additionally, the backing plate 42 provides rigidity to the anode material as it is consumed during the operation of the fuel cell 10. This facilitates the consistent and steady generation of electrical power during the life of the fuel cell. Yet another advantage of the present invention is that the current collector strap is securely attached to the anode 40 by virtue of the rivet head 78 and does not rely on flimsy attachments that may be attacked by the materials contained within the fuel cell. Still yet another advantage of the present invention is that it can be employed in either a moving anode or fixed anode configuration and provide a secure, robust attachment that heretofore has been unavailable in the art. It has been found through testing that the present configuration may be employed for greater than 160 hours of use, whereas previous, less reliable attachments of the boot to the anode were found to only last about 6 hours. Still yet another advantage of the present invention is that the cooling of the anode is enhanced by the rivet heads 78 functioning as cooling fins.

Thus, it can be seen that the objects of the invention have been satisfied by the structure and use of the invention as presented above. While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A fuel cell having a secured anode seal comprising:
a housing for carrying a cathode;
a boot secured to said housing and having a plurality of holes therethrough; and
an anode having a plurality of integral posts extending therefrom and into said plurality of holes, said plurality of integral posts deformed into rivet heads to secure said boot to said anode.

2. The fuel cell according to claim 1, further comprising:
a backing plate having a plurality of holes, said backing plate disposed over said plurality of integral posts and secured underneath said rivet heads.

3. The fuel cell according to claim 2, further comprising:
a collector strap having a plurality of holes, wherein said collector strap is disposed over said backing plate which is disposed over said boot, all of which are disposed over said plurality of integral posts and secured underneath said rivet heads.

4. The fuel cell according to claim 3, wherein said housing carries a cathode spaced apart from said anode, wherein said cathode has a plurality of cathode standoffs disposed thereon to maintain a predetermined distance between said cathode and said anode.

5. The fuel cell according to claim 3, wherein a spring is disposed between said anode and said housing to bias said anode toward a cathode carried by said housing.

6. The fuel cell according to claim 3, wherein said housing includes a base for carrying a cathode and a top frame securable to said base with said boot secured between said base and said top frame, and wherein a spring is disposed within said housing to bias said cathode and said anode toward one another.

7. The secured anode seal according to claim 3, wherein said backing plate has at least one downwardly extending ridge that contacts said boot.

8. An anode assembly received in a fuel cell, comprising:
   an anode with a plurality of posts;
   a boot; and
   a collector strap, wherein said boot and said collector strap are connected to said anode by deformation of said plurality of posts into rivet heads.

9. The anode assembly according to claim 8, wherein said boot and said collector strap each has a plurality of holes through which said plurality of posts extend.

10. The anode assembly according to claim 9, further comprising:
    a backing plate having a plurality of holes therethrough and a downwardly extending ridge, said plurality of posts extending through said plurality of holes of said backing plate and said ridge contacting said boot.

11. The anode assembly according to claim 10, further comprising a layer of insulating material disposed over said boot, said collector strap and said backing plate.

12. The anode assembly according to claim 11, wherein said plurality of posts integrally extend from said anode and are disposed about an outer periphery of said anode, and wherein said backing plate extends only over said outer periphery and wherein said collector strap extends only over a portion of said backing plate.

13. The anode assembly according to claim 11, wherein said boot is made of a flexible rubber-like material.

14. The anode assembly according to claim 11, wherein said collector strap has at least one lead extending therefrom for attachment to a fuel cell.

15. A fuel cell comprising:
    at least one housing having a base securable to a top frame, one of said top frame and said base having a notch and a recessed edge facing the other of said top frame and said base;
    a cathode secured to said at least one housing;
    a boot secured between said base and said top frame and received in said notch and said recessed edge, wherein an electrolyte chamber is formed between said boot and said cathode and a coolant chamber is formed between said boot and one of said top frame and said base, said boot having a plurality of holes therethrough; and
    an anode having a plurality of posts extending through said plurality of holes, wherein each of said plurality of posts has a head for securing said boot to said anode for precluding migration of material between said electrolyte chamber and said coolant chamber.

16. The fuel cell according to claim 15, further comprising:
    a backing plate having a plurality of holes therethrough and a ridge extending therefrom, wherein said plurality of backing plate holes fit over said plurality of posts and underneath said head and wherein said ridge contacts said boot.

17. The fuel cell according to claim 15, further comprising:
    a collector strap having a plurality of holes therethrough and a lead extending therefrom, wherein said plurality of collector strap holes fit over said plurality of posts and underneath said head.

18. The fuel cell according to claim 15, further comprising:
    an enclosure frame secured to said housing spaced apart from said cathode to form an oxidizing chamber.

19. The fuel cell according to claim 16, further comprising:
    a spring disposed between said housing and said anode to bias said anode toward said cathode.

* * * * *